Dec. 1, 1953
S. M. KIPP
2,661,182
MULTIWAY PISTON VALVE WITH REMOVABLE
BUSHING AND PACKING STRUCTURE
Filed Feb. 2, 1948
FIG. 1.
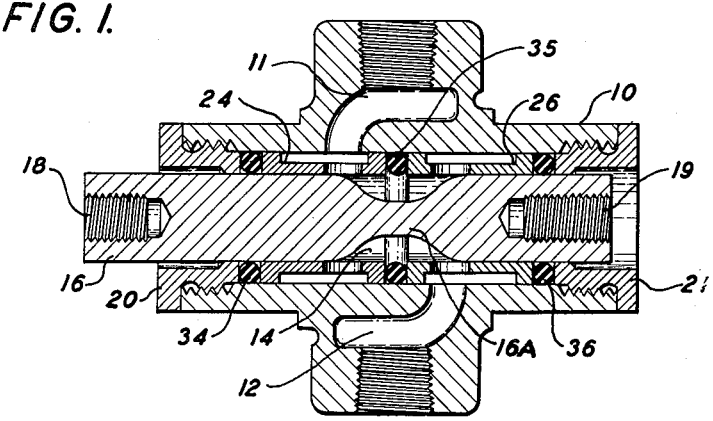
FIG. 2.
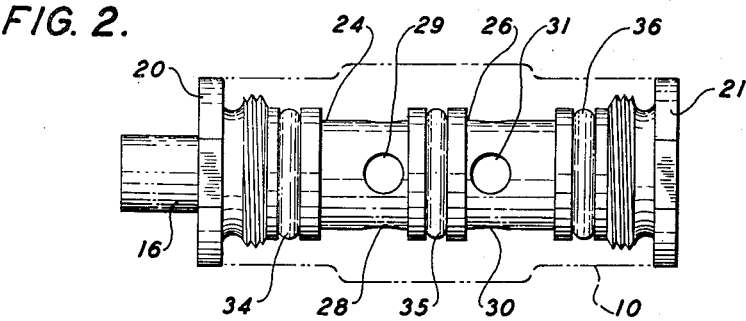
FIG. 5.
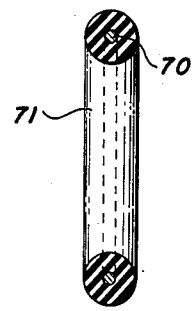
FIG. 3.
FIG. 4.
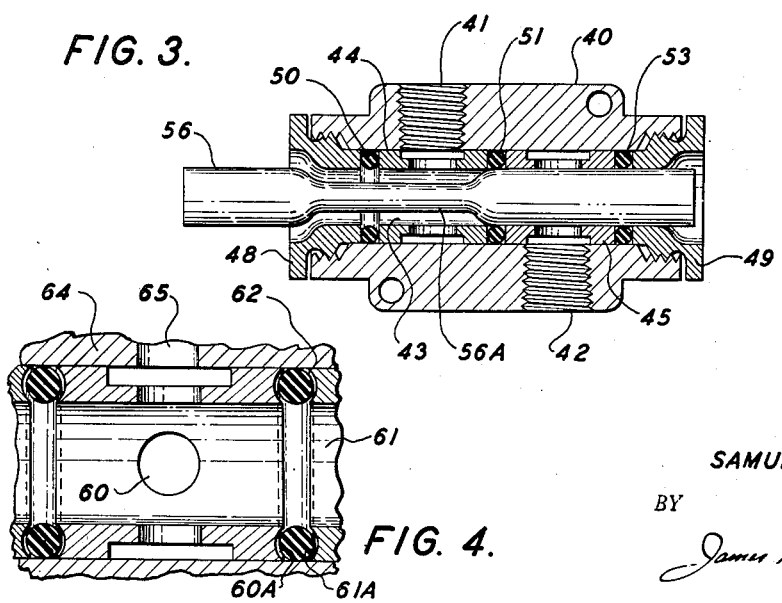
INVENTOR.
SAMUEL M. KIPP
BY
James B Christie
ATTORNEY Patented Dec. 1, 1953

2,661,182

UNITED STATES PATENT OFFICE 2,661,182

MULTIWAY PISTON VALVE WITH REMOVABLE BUSHING AND PACKING STRUCTURE

Samuel M. Kipp, Pasadena, Calif.

Application February 2, 1948, Serial No. 5,791

3 Claims. (Cl. 251—76)

This invention relates to valves and more particularly to valves known as plunger or sliding stem valves. The valve of the invention is characterized by improved wear resistance and ease of assembly and disassembly.

Stem or plunger valves find wide industrial application because they are comparatively easy to service and because further, they are so readily adaptable to many different uses. Thus such a valve, without change of construction, may be used interchangeably as a manually operated valve, lever valve, solenoid valve, etc. This flexibility results from the nature of the valve, which includes a stem or plunger slideably journaled through a housing or valve body. Two or more ports in the housing may be interconnected by proper alignment of a reduced diameter section of the stem with the ports. By sliding the stem within the housing this alignment can be established or disestablished to open and close the valve respectively. Substantially any number of ports in the housing can be variously interconnected in this manner by proper location thereof and corresponding configuration of the plunger.

In conventional plunger valves having an inlet and outlet port for example, an annular bushing is interposed in the housing bore adjacent one of the ports and a coil spring is similarly located with respect to the other port. The bushing, coil spring and packing glands, threaded into the opposite end of the bore, are separated by annular U packers. The coil spring is slightly compressed within the valve to exert a thrust on a series of spreaders located in operable association with each of the U packers. The valve stem passes through the bushing, spring, and packers, the latter acting as liquid seals against the major circumference of the stem.

The above type of construction has several disadvantages. Paramount among these is the comparative complexity thereof which necessitates extreme care in assembly and servicing to insure proper sequential insertion of the various parts as well as proper facing of the packers and associated spreaders with respect to the spring. Furthermore, U packers are not entirely satisfactory in this type of application for each time they are inserted or withdrawn one of the lips thereof tends to catch in the body parts. This not only makes assembly more difficult but also accelerates the wear on the packer. Furthermore, the application of an artificial spreading force to the U packers, which application is essential to proper functioning thereof, induces distortion when a reduced diameter section of the plunger is aligned therewith. When the valve is operating at comparatively high pressures the sudden distortion thus produced coupled with the natural tendency of the packers when suddenly subjected to such pressure, tends to "blow" the packers. In any case this distortion results in increased fatigue of the packing, increases the force necessary to slide the plunger, and at the same time causes absorption of more than its share of the spreading force thereby interfering with the efficiency of the other packing.

A feature of the valve of the instant invention is the elimination of these U packings with consequent simplification of the entire valve assembly. This results not only in assembly and servicing simplification but also in increased durability and improvements in fluid sealing particularly at comparatively high pressure operation.

In one embodiment the present valve comprises a body or housing having a central longitudinal bore therethrough and at least two ports opening into the bore. A cylindrical stem is slideable in the bore and is provided with a section of its length having a reduced diameter, this section being alignable with the ports. A pair of identical bushings, one being associated with each of the ports, are slideably held within the bore by means of packing glands affixed in opposite ends of the bore. Each of the bushings, and the packing glands, are separated from each other by a plurality of O rings which act along their inside circumference as dynamic fluid seals against the major circumference of the stem and along their outside circumference as substantially static fluid seals around the circumference of the bore.

Attention is called to the fact that the O rings as here employed, and as will become more apparent as the description proceeds, function as fluid seals both internally and externally, which to the best of my knowledge constitutes a new application of O rings which generally are employed as seals along either their inner or outer circumference but not both.

The invention may be better understood from the following detailed description thereof taken in relation to the accompanying drawing in which:

Fig. 1 is a sectional elevation through a simple two ported valve according to the present invention;

Fig. 2 is a plan view of the valve of Fig. 1 with the housing shown in phantom;

Fig. 3 is a sectional elevation through a second embodiment of the valve of the invention, provided with an atmospheric exhaust port;

Fig. 4 is a partial sectional elevation showing a modification of the construction of the bushings; and Fig. 5 shows a cross section through a modified form of O ring particularly adapted to use in valves subjected to high pressure operation.

Referring to Figs. 1 and 2, the embodiment of the valve there shown comprises a body 10 having ports 11 and 12 which are threaded adjacent the exterior of the housing to receive incoming and outgoing pipes (not shown) and open into a longitudinal bore 14 at longitudinally spaced points. Although the ports 11 and 12 here shown are not only spaced longitudinally from each other but also radially from each other, the latter spacing is not essential and is employed simply to give the valve a uniform appearance. A stem 16 the major diameter of which is somewhat less than the diameter of the bore 14 is slideable within the bore and includes a section 16A of a reduced diameter. The stem 16 is tapped at either end 18, 19 to receive an operating knob, lever, solenoid shank or the like. The opposite ends of the bore 14 are tapped to receive packing glands 20, 21 which retain the internal parts of the valve in correct position.

An annular bushing 24 is disposed within the bore 14 adjacent the port 11 and an identical bushing 26 is disposed within the bore 14 adjacent and in line with the port 12. The major lengths of each of the bushings is of smaller outside diameter than the bore 14 so as to provide an annular passage in line with the respective port. The annular passage which may be formed in the body instead of in the bushing facilitates fluid flow through a plurality of radial ports in the bushing. Each of the bushings in the embodiment shown is provided with four uniformly spaced radial ports such as ports 28, 29 in the bushing 24 and ports 30, 31 in the bushing 26. The ends of each of the bushings are of substantially the same outside diameter as the bore 14 and the inside diameter of each of the bushings substantially corresponds to the major diameter of the stem 16.

O rings 34, 35 and 36 are interposed respectively between the packing gland 20, and the bushing 24, between the two bushings 24, 26 and between the bushing 26 and the packing gland 21.

The outside circumference of each of the O rings acts as a substantially static fluid seal against the wall of the bore 14 and the inside circumference of each acts as a dynamic seal against the major diameter portions of the stem 16.

The valve in Fig. 1 is shown in the "open" position wherein fluid entering the port 12, for example, passes through the radial ports 30, 31, etc., in the bushing 26 and along the length of the bore defined by the reduced diameter section 16A of the stem, out ports 28, 29, etc., in the bushing 24 and out the valve port 11. To close the valve, the stem 18 is displaced toward the right so that the major diameter section thereof to the left of the reduced diameter section 16A contacts the O rings 34 and 35 while the major diameter section thereof to the right of the reduced diameter section 16A contacts the O ring 36. In this position the bore 14 is sealed between the ports 11 and 12 and likewise between each of the ports and the ends of the bore 14.

The big advantage of the valve as described is the simplicity of its construction and the consequent ease of assembly and disassembly for servicing purposes. The bushings of Fig. 3, for instance, are identical in construction as are each of the O rings and they may be inserted alternatively into the bore without regard to spacing or sequential positioning. Furthermore, there is no difficulty in inserting O rings and it is not necessary to adjust spreaders and springs, etc., as is necessary when U packers are employed.

It is apparent that the length of the valve body and of the stem may vary over wide limits and that any number of ports interconnectable by a plurality of reduced diameter sections in the stem may be provided. Assembly of such a multiple valve involves nothing more than alternate introduction of an O ring and a bushing of the type shown in Fig. 3 into the bore again without regard to orientation or sequence.

A modification of the valve shown in Figs. 1 and 2 is shown in sectional elevation in Fig. 3 and includes a body 40 having the ports 41, 42 and a longitudinal bore 43. As in the foregoing valve a pair of bushings 44, 45 are disposed in the bore 43 in association with each of the ports 41, 42. Similarly the end of the bore is provided with packing glands 48, 49 and the packing glands and bushings are separated from each other by a series of O rings 50, 51, 53 which function in the same manner as the O rings in the valve of Fig. 1. A stem 56 slidable in the bore 43 of the valve shown in Fig. 3 is provided with a reduced diameter section 56A of such length that when the stem is in the position shown in Fig. 3 the port 41 is vented to the atmosphere out the left hand end of the bore 43. When the stem is displaced toward the right sufficiently to interconnect the ports 41, 42 along the reduced diameter length 56A of the stem, the left hand end of the bore is sealed from the atmosphere by engagement of the stem and O ring 50. This type of valve, having the atmospheric vent for one of the valve ports, finds wide spread application as an air control valve.

As in the foregoing embodiments, the bushings 44, 45 in the valve of Fig. 3 are provided with a circumferential recess to form an annular channel for fluid flow from the ports in the body through the ports in the bushings. It is equally within the contemplation of the invention to form this annular channel by circumferentially recessing the body bore in radial alignment with each of the ports. In such case a circumferential recess in the bushing is unnecessary. However, the construction of the bushings as shown is preferred inasmuch as it is simpler to fabricate bushings of this type than to recess the valve body.

I have found that valves of the type described employing O rings instead of U packings operate at pressures considerably in excess of those attainable with valves having the U packers. Thus, I have operated the valve of the invention satisfactorily at pressures of as high as 700 lbs. per sq. in. The increased pressure range of the present valve is due to the greater stability of the O rings with respect to deformation and blow-outs than is exhibited by the U packers. However, the limiting factor in determining the permissible maximum operating pressure still appears to be the point at which the O rings will "blow-out." The tendency to "blow-out" which is exhibited by the O rings, albeit to a degree considerably less than that of the U packers, may be described with relation to Fig. 1. When operating at high pressures a sudden shift of the stem from a position in which the major diameter thereof is in contact with the inside diameter of the O ring 35, for example, to a position as shown in the Fig. 1, produces a correspondingly sudden pressure change on the bushing adjacent the O ring and at the same time a sudden removal of the support around the inner circumference of the O ring. This pressure change if sufficiently great and if sufficiently sudden will tend to squeeze out or "blow" the O ring into the bore.

I have materially reduced this tendency of the O rings to "blow" and consequently increased the maximum operating pressure of the valve by constructing the bushings with indented end faces conforming in part to the curvature of the transverse circumference of the O rings. Fig. 4, a sectional elevation through a portion of the valve, shows two bushings 60, 61 and an inner O ring 62 disposed within a body 64. The bushing 60 is provided with an annular circumferential recess and a plurality of ports communicating between a port 65 in the body and the body bore. The bushings 60, 61 differ from the bushings above described in the shape of their end faces which as shown are concave in profile. These faces need not be completely concave as shown, but may be indented in any configuration to partially conform to the shape of the O ring surface. In this type of construction the O ring 62 is housed between two concave annular faces 60A and 61A of the bushings 60, 61 so that the diameter of the O rings is greater than the space between the two bushings. I have found, as indicated above, that this type of construction greatly reduces the tendency of the O ring to "blow" for in order to "blow" the O ring must be deformed to such an extent as to squeeze it through an opening smaller than its own diameter. The construction as shown in Fig. 4 has the advantage even at low pressures of exerting a more uniform "squeeze" on the O rings and facilitating both the static and dynamic seal. However, for low pressure operation, say up to about 500 lbs. per sq. in., the construction shown in Figs. 1 and 2 is entirely satisfactory.

The O rings illustrated in Figs. 1 and 4 generally comprise plastic rings which I have found to be most satisfactory when made of hard, resilient rubber. The O rings differ dimentionally from conventional O rings used for other purposes. This difference is primarily in the ratio of the inside diameter of the ring to the transverse diameter of a section through the ring. Thus a standard O ring of one half inch inside diameter (i. d.) has a cross sectional diameter of $\frac{3}{32}$ inch while an O ring of the same i. d. used in the present invention has a cross sectional diameter of $\frac{1}{16}$ inch. Similarly a standard ring of $1\frac{1}{16}$ inches i. d. will have a $\frac{1}{8}$ inch cross sectional diameter as compared to a $\frac{1}{16}$ inch value for my O ring. Thus the O rings employed in the valve of the invention have a cross sectional diameter of 2 or more times that of a standard O ring of the same inside diameter. This feature serves to aid in the accomplishment of the duo-sealing function of the rings and also permits use of a bushing of sufficient wall thickness to tolerate the circumferential recess as described.

An improved form of O ring is shown in sectional elevation in Fig. 5 and includes a wire core 70 about which a rubber ring 71 is mounted. In a typical O ring for use in a ¼ inch valve, for example, the wire core 70 may be of 18 gauge metal and the O ring itself may have a diameter of approximately $\frac{1}{16}$ inch. Other materials such as plastics, etc., may be used in place of wire for the ring core. The use of an O ring having a reinforcing core has no particular advantages for low pressure operation but in pressures in excess of 500 lbs. further serves to resist the forces which normally cause blow-outs. It is apparent from the description relative to Figs. 4 and 5 that for extremely high pressure operation it may be advisable to employ an O ring having a wire core in conjunction with bushings having concave outer edges to combine the "blow-out" resisting effects of both features, since such "blowouts" are a function of the operating pressure.

I have provided a highly simplified and efficient plunger type valve having a minimum of parts and a high degree of standardization of the parts employed. Modifications in the construction of the valve with a view towards the provision of additional ports and interconnecting reduced diameter sections of the plunger or stem obviously fall within the contemplation of the invention as illustrated and described.

I claim:

1. A valve comprising a housing having a longitudinal bore therethrough and at least two ports opening into the bore, a separate annular bushing symmetrical in design and disposed in the bore in line with each port, the bushings being circumferentially recessed to form an annular passage with at least one radial port therein opening into the annular passage, a packing gland fastened into each end of the bore, the bore being of substantially constant diameter in the region between the packing glands, a plurality of ring-type resilient packers disposed in the bore, the bushings and packing glands being separated from each other by a single resilient packer, and a cylindrical stem in said bore slidably disposed within said annular bushings, the stem having a reduced diameter section alignable with the ports in one position to allow flow, the cross-sectional transverse diameter of each ring-type packer being large enough to form a dynamic line-type seal with the stem at the inner circumference of the packer and a static line-type seal with the wall of the bore at the outer circumference of the packer, the stem being movable to a second position to block the flow, the bushings being substantially identical with each other and the packers being substantially identical with each other to facilitate the alternate slidable assembly and maintenance disassembly thereof without further regard to orientation.

2. A valve according to claim 1 wherein the bushings have annular end faces shaped so as to at least approximately conform in part to the wall surfaces of the packers.

3. A valve comprising a housing having a longitudinal bore therethrough and at least two ports opening into the bore, a separate annular bushing symmetrical in design and disposed in the bore in line with each port, the bushings being circumferentially recessed to form an annular passage with at least one radial port therein opening into the annular passage, a packing gland fastened into each end of the bore, the bore being of substantially constant diameter in the region between the packing glands, a plurality of ring-type resilient packers disposed in the bore, the bushings and packing glands being separated from each other by a single resilient packer, and a cylindrical stem in said bore slidably disposed within said annular bushings, the stem having at least one reduced diameter section alignable with the ports in one position to allow flow, the cross-sectional transverse diameter of each ring-type packer being large enough to form a dynamic line-type seal with the stem at the inner circumference of the packer and a static line-type seal with the wall of the bore at the outer circumference of the packer, the stem being movable to a second position to block the flow, the bushings being substantially identical with each other and the packers being substantially identical with each other to facilitate the alternate slidable assembly and maintenance disassembly thereof without further regard to orientation, one reduced diameter section of the stem being of such length as to vent one of the body ports to atmosphere through an end of the bore when that port is sealed from the other body ports.

SAMUEL M. KIPP.

References Cited in the file of this patent

UNITED STATES PATENTS

| Number | Name | Date |
|---|---|---|
| 137,559 | Morley | Apr. 8, 1873 |
| 207,871 | Horton | Sept. 10, 1878 |
| 1,861,916 | Hennebohle | June 7, 1932 |
| 1,988,545 | Donn | Jan. 22, 1935 |
| 2,019,257 | Gibbs | Oct. 29, 1935 |
| 2,320,905 | Bateholts | June 1, 1943 |
| 2,358,228 | Hoof | Sept. 12, 1944 |
| 2,415,417 | Collins | Feb. 11, 1947 |
| 2,417,494 | Hoof | Mar. 18, 1947 |
| 2,445,855 | Majneri | July 27, 1948 |
| 2,469,921 | Hoge | May 10, 1949 |
| 2,485,504 | Morgan | Oct. 18, 1949 |

FOREIGN PATENTS

| Number | Country | Date |
|---|---|---|
| 434,382 | Great Britain | Aug. 30, 1935 |